United States Patent [19]
Deveaud-Pledran et al.

[11] Patent Number: 5,559,613
[45] Date of Patent: Sep. 24, 1996

[54] PHOTOREFRACTIVE DEVICE WITH QUANTUM WELLS

[75] Inventors: Benoît Deveaud-Pledran, Ferney Voltaire; Christian Guillemot, Perros Guirec; Jean-Michel Gerard, Paris, all of France

[73] Assignee: France Telecom Etablissement Autonome De Droit Public, Paris, France

[21] Appl. No.: 286,703

[22] Filed: Aug. 5, 1994

[30]     Foreign Application Priority Data

Aug. 9, 1993 [FR] France .................... 93 09784

[51] Int. Cl.$^6$ .............................. G02B 5/18; G02B 5/32
[52] U.S. Cl. ...................... 359/4; 359/3; 359/248; 257/21
[58] Field of Search ..................... 359/3, 4, 7, 248; 257/14, 15, 21, 23

[56]                References Cited

U.S. PATENT DOCUMENTS

| 5,004,325 | 4/1991 | Glass et al. | |
| 5,315,430 | 5/1994 | Brennan et al. | 359/248 |
| 5,323,019 | 6/1994 | Dutta et al. | 359/248 |
| 5,345,328 | 9/1994 | Fritz et al. | 359/248 |
| 5,381,260 | 1/1995 | Ballato et al. | 359/248 |

FOREIGN PATENT DOCUMENTS 9222847   12/1992   WIPO .

OTHER PUBLICATIONS

Optics Communications, vol. 73, No. 5, Nov. 1, 1989, pp. 351–356 Wolffer, et al.
1983 Amer. Institute of Physics, Appl. Phys. Lett 42, (10), May 15, 1993, pp. 864–866, Chemla, et al.
L'écho des Recherches, No. 149, 3$^e$trimestre 1992, pp. 29–38 E. Bigan.
Appl. Phys. Lett. 60 (20), May 18, 1992; 1992 American Institute of Physics, pp. 2457–2459, Susa and Nakahara.
Journal of the Optical Society of America, vol. 7, No. 11, Nov. 1990, New York, pp. 2217–2225, Nolte D D et al., "Resonant Photodiffractive Effect In Semi–Insulating Multiple Quantum Wells".
Applied Physics Letters, vol. 59, No. 7000, Oct. 1991, New York, pp. 1832–1834, Partovi A et al., "High Sensitivity Optical Image Processing Device Based On CdZnTe/ZnTe Multiple Quantum Well Structures".
Optics Letter, vol. 17, No. 9, May 1992, New York, pp. 655–657, Partovi A et al., "High–Speed Photodiffractive Effect In Semi–Insulating CdZnTe/ZnTe Multiple Quantum Wells".
Applied Physics Letters, vol. 47, No. 10, Nov. 1985, New York, pp. 1099–1101, Goldstein L et al., "Growth By Molecular Beam Epitaxy And Characterization Of InAs/GaAs Strained–Layer Superlattices".

Primary Examiner—Jon W. Henry
Attorney, Agent, or Firm—Pearne, Gordon, McCoy & Granger

[57]                ABSTRACT

A photorefractive device intended to be exposed to a marking radiation which is provided so as to create a grating of interference fringes in the device and to a reading radiation diffracted by the created grating. The device includes an electro-optical material having a quantum well structure (24) and formed in an intrinsic semi-conductor matrix (22, 24) and, on both sides of the material in the semi-conductor matrix, suitable means (28, 30) to trap, both parallel to the axis of the structure and perpendicular to this axis, free carriers generated by the marking radiation.

7 Claims, 4 Drawing Sheets

PHOTOREFRACTIVE DEVICE WITH QUANTUM WELLS

FIELD OF THE INVENTION

The present invention concerns a photorefractive device with quantum wells.

BACKGROUND OF THE INVENTION

This photorefractive device or photorefractive structure can be used in optical telecommunications applications, especially in optical switching applications. In a disposition in the form of a phase conjugation double mirror, this structure is able to self-focus a luminous beam between two monomode optical fibers. In this respect, the following documents can be consulted:

(1) N. Wolfer, P. Gravey, J. Y. Moisan, C. Laulan, J. C. Launay, Optics Commun., 73, 351 (1989).

The embodiment of a flat matrix of photorefractive cells makes it possible to connect networks of optical fibers.

The present invention authorizes the implementation of a significant photorefractive effect with the aid of thin films or layers of semi-conductor materials. In addition, the device of the invention preferably is able to have a large use or repetition frequency (Writing and erasion).

Note that the operating principle of a photorefractive material resides in the marking, inside this material, of a grating of refraction indices which are relatively large so as to effectively diffract incident optical waves (reading radiation). This grating of refraction indices derives from a network of electric charges optically excited via the interference of two luminous beams constituting the marking radiation and generally being laser beams.

In known types of photorefractive materials, this network of electric charges is preserved via the trapping of these charges on deep centers. This type of photorefractive material ought to have the following characteristics: it needs to be semi-insulating in the absence of light; it needs to exhibit an electro-optical effect as powerful as possible so as to exhibit significant refraction index variations; and it needs to have a sufficient number of deep centers so as to produce local modifications of the electric field.

There is currently no material able to optimize both the electro-optical function and the trapping function effected by deep centers. So as to resolve this drawback, a device described in the following document:

(2) G. Picoli, P. Gravey, J. E. Viallet, French patent Application No. 91 07528 of 19 Jun. 1991—see also the document WO 92/22847, has been embodied so as to separate these two functions. In this known type of photorefractive device, a quantum well material possessing a high electro-optical coefficient is sandwiched between two semi-conductor layers having opposing dopings. Thus, a significant photorefractive effect is obtained with an active layer whose thickness is close to 1 micrometer. On the other hand, the deep centers of this known device have a low coefficient of optical absorption ($10$ $cm^{-1}$ for a concentration of about $10^{17}$ $cm^{-2}$), which requires a significant incident optical power since merely one thousandth of the available power is absorbed in the layers which are doped by the deep centers and whose thickness is about 1 micrometer.

Moreover, it is well known that it is possible to embody extremely effective electro-optical devices by applying an electric field to a multiple quantum well or to a super lattice. In this respect, it is possible to consult the following document:

(3) D. S. Chemla, T. C. Damen, D. A. B. Miller, A. C. Gossard, W. Wiegmann, Appl. Phys. Lett., 42, 864 (1983), which describes electro-optical devices based on the confined Stark effect. The following document may also be consulted:

(4) E. Bigan, L'Echo des Recherches, 149, 29 (1992) which describes electro-optical devices using super-grating Wannier Strak modulators.

The method is also known on how to transform structures with quantum wells into photorefractive structures by using implantation or irradiation so as to create deep centers in these structures. In this respect, the following document may be consulted:

(5) D. D. Nolte, D. H. Olson, G. E. Doran, W. H. Knox, A.M. Glass, "Resonant photorefractive effect in semi-insulating multiple quantum wells", J. Opt. Soc. Am, B, 7, 2217–2225 (1990).

Thus a photorefractive effect is obtained but this effect does not use (in the GaAs system) the advantages of the confined Stark effect as the electric field associated with the network of electric charges is parallel to the planes of the quantum wells. These types of structures result in obtaining low refraction index variations.

Higher refraction index variations have been obtained in quantum multiple wells with a II–VI semi-conductor materials base in a configuration where the electric field may be applied perpendicular to the layers of these multiple quantum wells. In this respect, the following document may be consulted:

(6) Partovi, Glass, Olson, Zydzik, Short, Feldman, Austin, Opt. Lett., 17, 655 (1992).

However, the photorefractive devices obtained in this way require the use of an alternative polarization as the electric charges are not stored correctly adjacent to the contact layers of these devices.

SUMMARY OF THE INVENTION

The present invention concerns a photorefractive device or photorefractive structure which is simple and has better performances than the known type of devices mentioned above. The device of the invention uses the high optical non-linearities of structures with quantum wells. A "quantum well structure" is understood to be a multiple quantum well or a super-lattice or even a more complicated periodic structure, such as a double quantum well periodic structure.

More specifically, the present invention concerns a photorefractive device intended to be exposed to a marking radiation which is provided so as to create a grating of interference fringes in the device and to a reading radiation diffracted by the created grating. The device includes an electro-optical material having a structure of quantum wells and being formed in an intrinsic semi-conductor matrix, and means for modifying the electric field in this material during an illumination by the marking radiation. The device is characterized in that the modification means are placed on both sides of the material in the semi-conductor matrix and are able to trap, both parallel to the axis of the structure and perpendicular to this axis, free carriers generated by the marking radiation (the axis of the structure being an axis perpendicular to the layers constituting the quantum wells).

As shall be seen more clearly subsequently, the present invention thus has the twin advantage of being able to trap a large number of electric charges and of making it possible to work with a reading beam whose wavelength is close to an excitonic resonance, that is within a range where the refraction index variations are significant. Thus, a device is obtained which is improved with respect to the known devices mentioned earlier and in particular the devices mentioned in document (6). In fact, the technique described in document (6) also involves the use of a reading beam whose wavelength is situated adjacent to an excitonic resonance, but the present invention makes it possible to trap a larger number of charges than allowed by this known technique.

The modification means may include on both sides of the material in the semi-conductor matrix at least one rough quantum well or a plane of inclusions able to trap the free carriers. A "rough quantum well" is understood to be a quantum well whose width locally varies by more than 10%.

According to one particular embodiment of the device of the invention, the inclusions are made of a semi-conductor material whose band gap has a width smaller than that of the band gap of the material of the quantum wells. It is also possible to use inclusions made of a metallic material. The inclusions may have sizes of about 5 nm. The density of these inclusions in each inclusion plane may be about $10^{11}$ $cm^{-2}$.

So as to obtain a high speed photorefractive device, the thickness of the intrinsic semi-conductor matrix situated on both sides of the unit containing the electro-optical material and delimited by the inclusion planes is preferably sufficiently small so as to enable the carriers trapped by the inclusions to leave the latter via a tunnel effect through this intrinsic semi-conductor matrix thickness. In this case, on both sides of the unit containing the electro-optical material and delimited by the inclusion planes, the intrinsic semi-conductor matrix may form a potential barrier with a height smaller than the one formed by this matrix inside this unit.

The intrinsic semi-conductor matrix may constitute the unintentionally doped region of a p-i-n (p-i-n diode) or $n^+/i/n^+$ or $p^+/i/p^+$ type structure. The electro-optical material may have a multiple quantum well structure or a super-lattice structure.

BRIEF DESCRIPTION OF THE DRAWINGS

The present invention shall be more readily understood from a reading of the description of non-restrictive embodiment examples given by way of illustration with reference to the accompanying drawings on which.

DETAILED DESCRIPTION OF THE PREFERRED EMBODIMENTS

Figure 1:
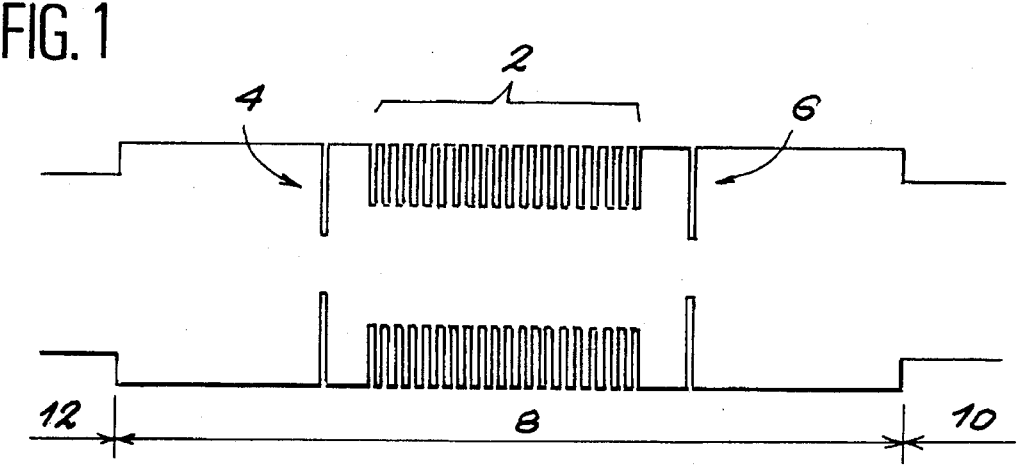
FIG. 1 is a diagram of bands illustrating the principle of the present invention.

FIG. 1 diagrammatically illustrates the diagram of bands of a device conforming to the invention which includes a quantum well electro-optical structure 2 and, on both sides of this structure 2, one or several inclusion planes 4 and 6. In the example shown, the quantum well structure 2 and the inclusion planes 4 and 6 are formed in the unintentionally doped portion 8 of a p-i-n diode which has a reverse bias. The zone p and the zone n of the diode respectively bear the references 10 and 12 on FIG. 1. Each inclusion plane, which is parallel to the layers constituting the wells, contains in the example shown a large number of small three-dimensional inclusions of a semi-conductor material whose band gap has a width smaller than that of the band gap of the material constituting the quantum wells.

The quantum well structure 2 is subjected to the electric field generated in the reverse biased diode. This electric field is perpendicular to the quantum wells.

When the device is exposed to a marking radiation which creates a grating of interference fringes in the device, free carriers are created by means of inter-band luminous absorption on the clear fringes of this grating of interference fringes. This creation of free carriers reduces by means of screening the electric field generated in the diode at the very location of these clear fringes. Thus, via the modulation of the confined Stark effect along the interference fringes grating, the refraction index of the structure is modulated for the wavelengths (reading radiation) close to the excitonic resonance wavelength.

As indicated earlier, the invention thus has two advantages, being able to trap a large number of electric charges (by virtue of the inclusions) and making it possible to work close to an excitonic resonance, that is in a region where the refraction index modifications are significant. However, so as to ensure that the photorefractive effect is sufficient, it is essential that the network of electric charges associated with the grating of interference fringes is maintained in spite of the electric fields present and charge diffusion phenomena.

The network of charges is maintained solely by means of the inclusions. The inclusions have a function of trapping the free carriers, electrons or holes according to the side in question of the structure (the holes are trapped on the side of the zone p and the electrons are trapped on the side of the zone n) and in addition avoid any lateral diffusion of these carriers.

The blocking, at least temporary, of the carriers, laterally (that is, parallel to the layers of the structure) and axially (that is, perpendicular to these layers) allows for a marking of a network of electric charges and the modification associated with the electric field in the quantum well structure. This constitutes an essential aspect of the photorefractive device of the invention which renders the latter much more effective than the known devices mentioned above.

Figure 2A:
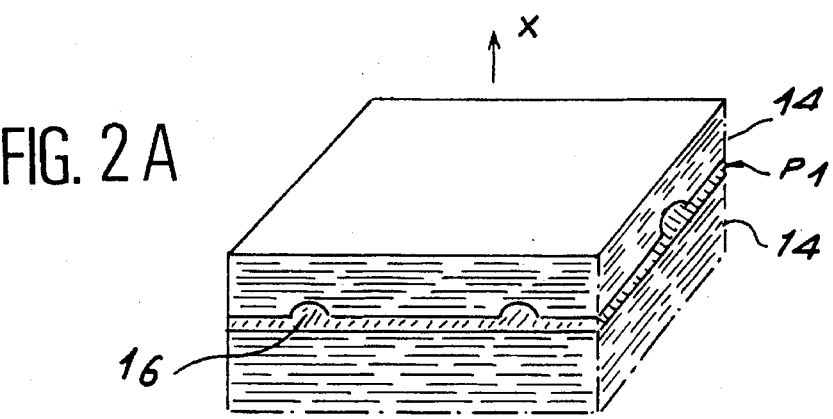
FIGS. 2A to 2C diagrammatically show obtaining inclusion planes able to be used in the present invention.
Figure 2B:
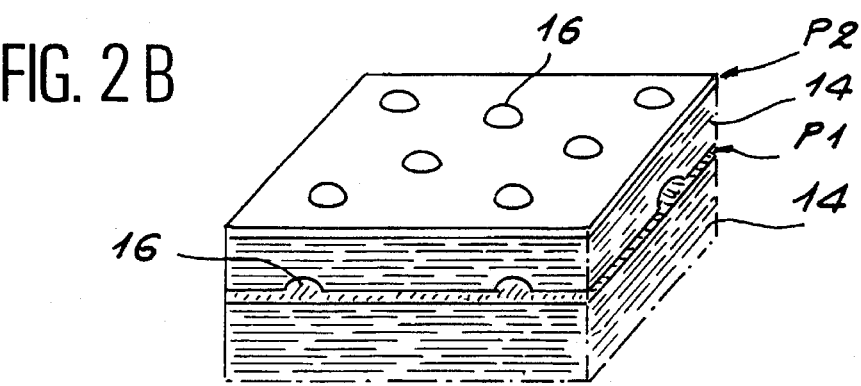
Figure 2C:
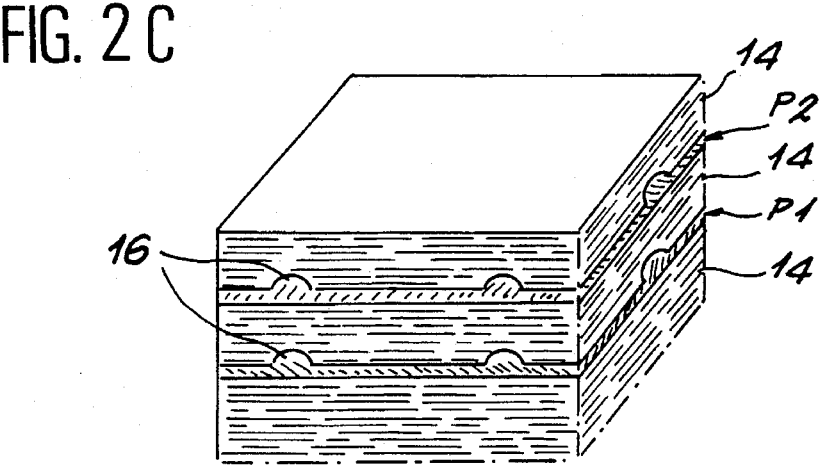

The inclusion planes may be formed during the growth of a device conforming to the invention by using the three-dimensional nucleation mode observed at the time of the epitaxial growth of the III–V semi-conductor materials which are very detuned with respect to the substrate used (it is assumed that the device is formed from such III–V materials). FIGS. 2A to 2C illustrate the creation of these inclusions in a III–V matrix. FIG. 2A shows the matrix 14, for example made of GaAs, in which a first plane P1 of inclusions 16, for example made of InAs has been formed. The thickness of the formed layers is counted along the axis X. FIG. 2B shows the formation of a second plane P2 of the inclusions 16 made of InAs in the matrix 14. FIG. 2C shows the matrix 14 in which the inclusion planes P1 and P2 have been formed, a layer of GaAlAs having been formed in the inclusion plane P2.

So as to form a plane of inclusions, the growth (which is effected by molecular jets, for example) of a layer of GaAs (along the direction X) is interrupted at the selected location. Then a fine layer of InAs is deposited on the surface of the GaAs film. This InAs material exhibits a high mismatching rate (about 7%) with the GaAs layer, which significantly influences its mode of growth. The first deposited molecular layer of InAs elastically accommodates this difference of mesh parameters and is deposited uniformity.

From the second monolayer, the growth mode at the normal growth temperature (between 500 and 550 degrees C.) becomes a three-dimensional growth mode. In this respect, the following document may be consulted:

(7) L. Goldstein, F. Glas, J. Y. Marzin, M. N. Charasse, G. Le Roux, Appl. Phys. Lett., 47, 1099 (1985).

Islets of InAs are formed on the surface. The size of these islets is relatively homogenous, namely about 5 nm, and the distribution of these islets on the surface of the GaAs layer is also relatively homogenous. This characteristic size of 5 nm is significantly lower than the period of the interference fringes grating, which is about 1 micrometer and thus allows for the marking of any photorefractive grating.

If at this stage the growth of the GaAs layer is resumed, the islets shall be buried inside this layer and thus shall form inclusions. These inclusions, which are stressed in the GaAs matrix, do not however contain any dislocation and retain good quality, which allows for conditions of optimal subsequent growth. The width of the InAs band gap is smaller than that of the GaAs band gap and the InAs inclusions thus have an attractive character for both the electrons and the holes.

The photoluminescence analysis of these InAs inclusions in GaAs has shown that the trapping of the carriers was extremely effective as the luminescence originating from these inclusions is highly intense (much more intense than that derived from the GaAs matrix). Similarly, studies have demonstrated the good optical quality of the inclusions. The analysis of the latter in transmission shows that the luminescence is intrinsic, that is linked to the presence of a high density of states joined with the energy of the luminescence.

Finally, the size of the inclusions and thus the position of the luminescence line (or the trapping energy) depends directly on the quantity of the InAs deposited after moving on to the three-dimensional growth mode. The confinement energies may range between 100 meV and 300 meV, both for the electrons and the holes, which allows for good lateral localization, even at ambient temperature and under the influence of a high lateral electric field. The density of the inclusions in a plane of inclusions is extremely high (about $10^{11}$ cm$^{-2}$), namely one inclusion every 30 nm. Thus, it is possible to capture a large number of carriers on one inclusion plane (about $10^{11}$ carriers per cm$^{-2}$).

The insertion of inclusions is compatible with the subsequent growth of a good quality quantum well structure. In order to achieve this, it suffices to deposit a fine buffer layer of GaAs (with a thickness of between 10 and 50 nm) following the InAs deposit so as to obtain a perfectly flat structure on which a quantum well structure can be epitaxially grown.

Figure 3:
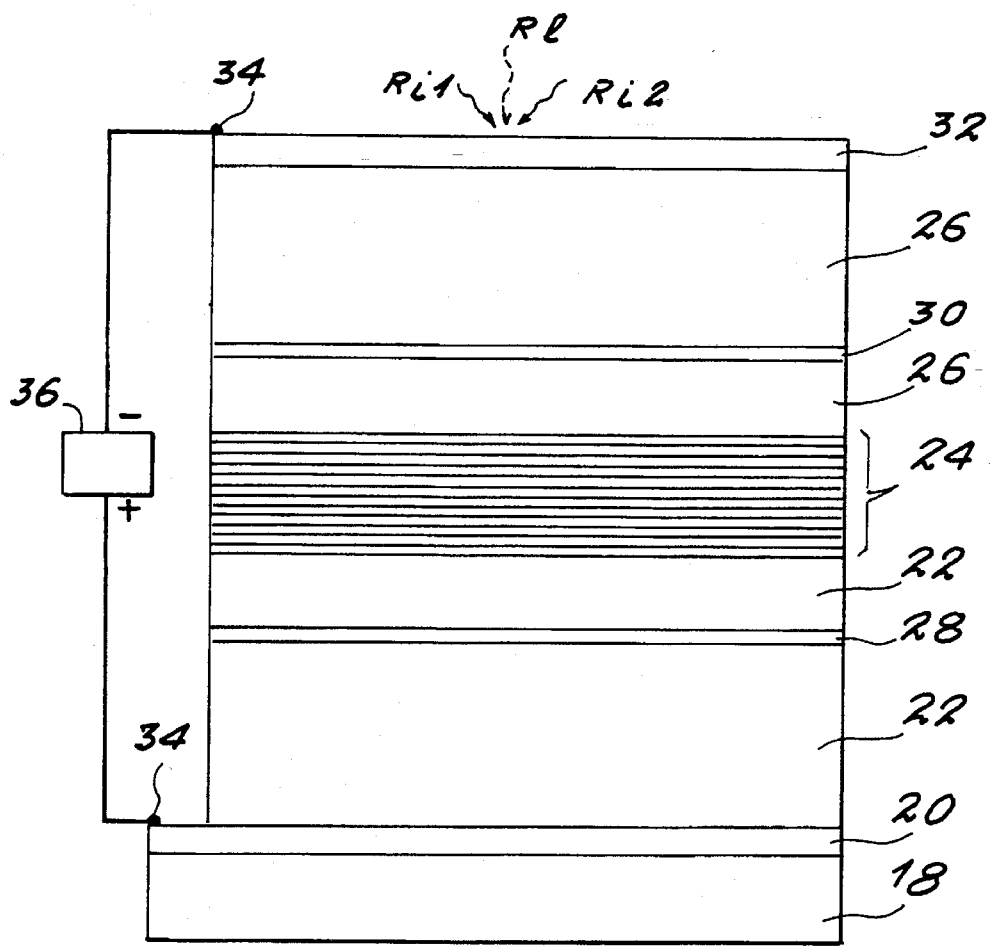
FIG. 3 is a diagrammatic view of a particular embodiment of the photorefractive device of the invention.

This technique can be generally used in a large number of other material systems. On an InP substrate, InAs inclusions can be produced in GaInAs on InP. In material systems epitaxially grown on GaAs, it can be conceived that the active wells, that is wells where electro-absorption takes place, are of InGaAs (with about 10% in In) and be thus slightly stressed, and that the inclusions of InAs are placed in a layer of AlGaAs. This is diagrammatically shown by FIG. 3 illustrating a photorefractive device conforming to the invention and which includes on an n+ doped GaAs substrate 18 an n+ doped GaAs contact film 20 (doping of about $10^{18}$ cm$^{-3}$) and, on this contact layer, an intrinsic AlGaAs layer 22 with a thickness of about 1 micrometer. This layer 22 is surmounted by an $In_xGa_{1-x}As$ quantum well structure 24, x being equal to 10%. For example, twenty wells are embodied whose constitutive layers have a thickness of 10 nm and alternate with 10 nm thick $Al_yGa_{1-y}As$ layers with y equal to 30%.

Formed above the quantum wells structure 24 is an intrinsic layer of AlGaAs with a thickness of about 1 micrometer. On both sides of the quantum well structure 24 and about 20 nm from the latter, the device includes inclusion planes 28 and 30 made up of three InAs monolayers. Above the intrinsic AlGaAs layer 26, the device includes a p+ doped GaAs Contact layer 32 (doping of about $10^{18}$ cm$^{-3}$).

FIG. 3 also shows electric contacts 34 disposed at the edge of the device, one of the contacts 34 being on the contact layer 32 and the other contact 34 being on the edge of the contact layer 20, the device being embodied in such a way that the edge of this contact layer 20 is not covered by the layers which are stacked on this layer 20. The polarization of the device of FIG. 3 is embodied by suitable biasing means 36 allowing for an inverse biasing of this device, the contact layer 32 being brought up to a negative potential with respect to the contact layer 20.

In the case where the wells are embodied from GaAs instead of InGaAs, the reading wavelength changes, the GaAs substrate is absorbent to this reading wavelength and it is then necessary to either remove the substrate by means of chemical attack, which is a complex process which limits the integration possibilities of the device, or place the latter on a reflecting layer situated between the n+ doped contact layer and the adjacent intrinsic zone. Experts in this field are well aware that such reflecting layers are easily able to be integrated by embodying a succession of AlAs and GaAlAs layers with a thickness equal to one quarter of the wavelength of the reading radiation. If the wells are made of GaAs, the barriers separating these wells may be AlGaAs and then InAs inclusions may be used.

It shall be noted that the equipotential planes which result from the contact layers respectively doped n+ and p+ have a tendency to screen the local charges variation obtained in the inclusions plane, and thus there is a need to insert a sufficient thickness of intrinsic material between the inclusion planes and these contact layers.

If it is desired to embody a rapid photorefractive device, it is essential that the trapped charges leave the inclusions much quicker than they are able to move laterally, that is parallel to the inclusion planes. It may be estimated that the characteristic lateral displacement time is about 1 ns and it is thus essential that the charges leave the wells corresponding to the inclusions in a comparable time. In order to do this, it suffices to authorize the leaving of these charges via a tunnel effect through a thin barrier, as shown in FIG. 4.

Figure 4:
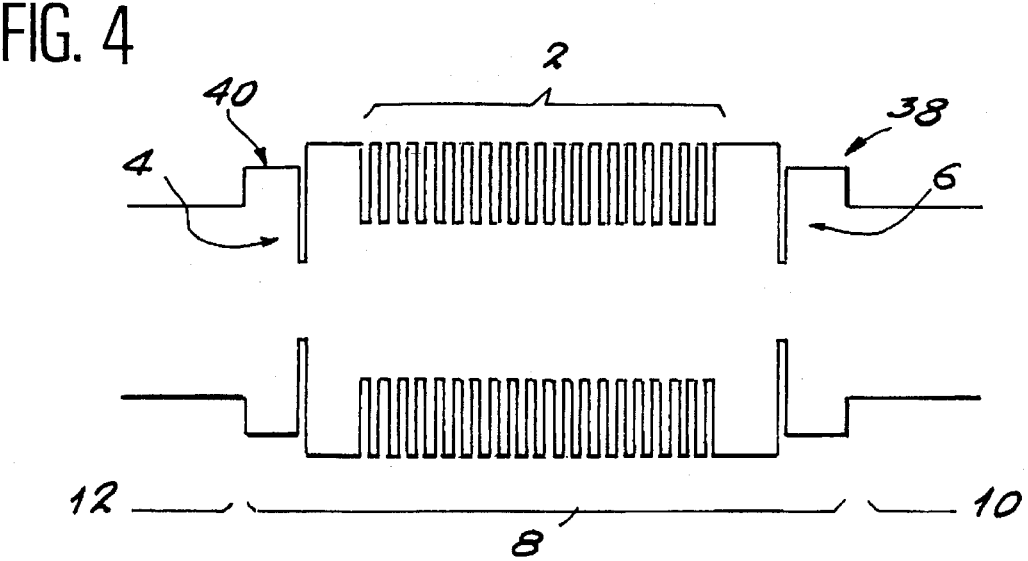
FIG. 4 is a diagram of bands of a photorefractive device conforming to the invention.

FIG. 4 is identical to FIG. 1, except for the thickness of the intrinsic material layers 38 and 40 which are respectively included between the zone 10 and the inclusion plane 6 and between the zone 12 and the inclusion plane 4, said thickness being much lower than in the case of FIG. 1 so as to allow for this tunnel effect. This thickness is, for example, about 5 nm.

In the example shown on FIG. 4, the barrier height of the intrinsic material (for example, intrinsic AlGaAs) is reduced outside the inclusions plane, that is in the zones 38 and 40, so as to favor the escape of the carriers parallel to the axis of the electric field, that is parallel to the axis X of FIG. 2A, with respect to their lateral displacement, that is perpendicular to the axis X.

It suffices to obtain an adequate ratio between the thermionic emission above the barriers and the escape time via the tunnel effect. For example, the zones 38 and 40 may be made of $Al_xGA_{1-x}As$ with x equal to 25%.

Two types of electro-optical structures may be envisaged for embodying the invention. One structure uses multiple quantum wells (alternating layers of thickness of about 15 nm and layers with thickness of about 10 nm, for example), which provides a confined Stark effect quadratic with the electric field. The other structure uses a super-lattice (alternating layers with a thickness of about 3 nm and layers, also with a thickness of about 3 nm, for example), which provides a Wannier-Stark effect linear with the electric field. This second configuration has the double advantage of the linearity of the electro-optical effect with respect to the applied electric field and better mobility of the carriers at the energy at which they are created. In fact, in a multiple quantum well structure, the photocreated carriers only give rise to a strong current if they manage to escape from the wells via thermoemmision or the tunnel effect, these two processes not being extremely effective. In a super-lattice structure, the carriers are able to undergo a tunnel effect below the energy of the barriers and may therefore be directly captured via the tunnel effect in the inclusions.

Figure 5:
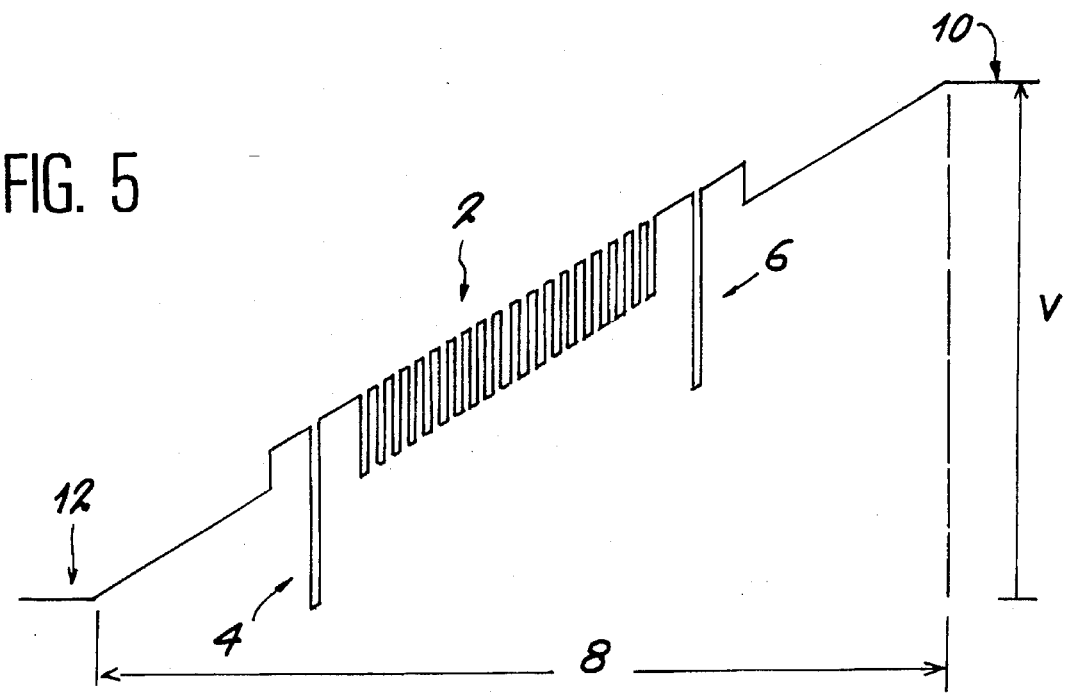
FIG. 5 diagrammatically illustrates the configuration of the bands of a device conforming to the invention biased without illumination.
Figure 6:
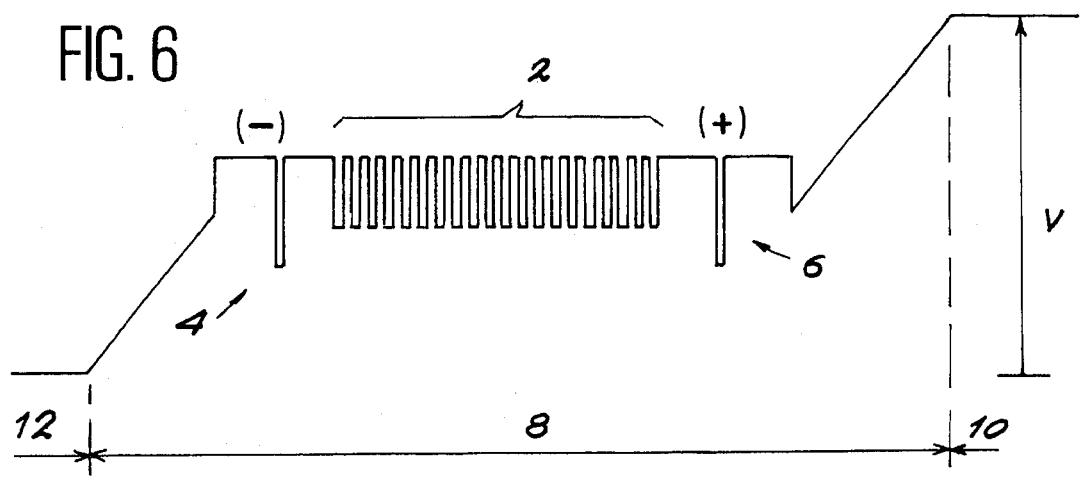
FIG. 6 diagrammatically illustrates the configuration of the bands of the device of FIG. 5 and biased with illumination.

FIGS. 5 and 6 diagrammatically illustrate the functioning of a photorefractive device conforming to the invention. This device is inversely biased by applying a suitable electric voltage V between the p+ doped contact layer (zone 10) of the device and the n+ doped contact layer (zone 12) of the device. An external electric field is thus applied to the device. In the absence of any illumination (FIG. 5), the electric field applied to the device is distributed uniformity. Under illumination (FIG. 6), that is in the clear interference fringes of the grating of interference fringes created on the surface of the device, positive charges are trapped inside the plane of inclusions 6 and negative charges are trapped inside the inclusions plane 4, which screens the electric field applied to all these quantum wells.

It is then possible to use the photrefractive device in its entirety or proceed with dividing the latter into pixels. The division into pixels may be obtained by etching the whole structure or by embodying localized electric currents.

Figure 7:
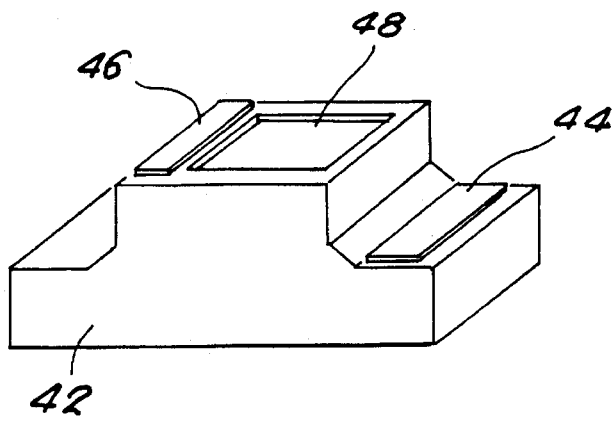
FIG. 7 diagrammatically illustrates the configuration of an elementary pixel of a photorefractive device conforming to the invention.

FIG. 7 shows an elementary pixel formed on an n+ type substrate 42. FIG. 7 also shows a layer 44 for metallizing the n+ type contact layer and a layer 46 for metallizing the p+ type contact layer. In the case where the quantum wells are embodied from GaAs, it is preferable to embody on the surface of the photrefractive device an optical window as shown in FIG. 7 where this optical window bears the reference 48.

Various other particular embodiments are possible for the device of the invention. For example, instead of embodying the inclusions as indicated earlier, it is possible to embody these inclusions by many techniques, one of them consisting of forming a thin layer of GaAs at a low temperature and then annealing this layer so as to form there arsenic inclusion, inclusions which, although metallic, are nevertheless able to trap electric charges and thus carry out what is required for the present invention. In addition, the material making up the inclusions may differ on both sides of the electro-optical material. So as to improve even further the performance of the device of the invention, instead of embodying symmetrical quantum wells, it is possible to embody these quantum wells as being asymmetrical in a similar way as described in the following document:

(8) N. Susda, T. Nakahara, Appl. Phys. Lett., 60, 2457 (1992).

Furthermore, instead of forming the quantum well structure in the intrinsic zone of a p-i-n diode, it is possible to form this quantum well structure in the intrinsic zone i of an n+/i/n+ type structure or a p+/i/p+ type structure by biasing this structure for using the thus obtained device.

To embody a device conforming to the invention, it is possible to use the epitaxial growth by molecular jets, but other techniques, such as the MOCVD technique, are possible. As mentioned previously, GaAs or InP based materials were proposed to embody a device conforming to the invention, but other type II–V semi-conductor materials, such as GaSb, are possible. Other families of semi-conductor materials can be used, such as the family II–VI.

FIG. 3 illustrates a particular operating mode of a device conforming to the invention. The marking of a diffraction grating is effected via interaction with the device by two laser beams Ri1 and Ri2 which together constitute the marking radiation and are disposed symmetrically with respect to a normal to the surface of the device. The wavelength of these two beams ought to be such that they are effectively absorbed by the super-structure of the device and not in the contact layers. In order to achieve this, a wavelength close to 900 nm is thus used. The optical power required to rapidly write a network of electric charges is about 0.1 $mW/cm^2$. The luminous beam R1 (reading radiation) it is desired to deflect, by the thus recorded hologram, shall have a wavelength slightly larger than that of the excitonic resonance, that is 960 nm. The optical power of this luminous beam R1 does not matter.

What is claimed is:

1. A photorefractive device intended to be exposed to a marking radiation which is provided to create a grating of interference fringes in the device, and to a reading radiation diffracted by the created grating, said device comprising:

an electro-optical material having a structure of layered quantum wells and being formed in an intrinsic semi-conductor matrix, said structure having an axis perpendicular to the layers of said quantum wells; and means for modifying an electric field in said material during an illumination by the marking radiation, said device being characterized in that said modifying means are placed on both sides of said material in said semi-conductor matrix and are able to trap, both parallel to the axis of the structure and perpendicular to this axis, free carriers generated by the marking radiation, said modifying means including on both sides of said material in said semi-conductor matrix at least one rough quantum well having a local width variation of more than 10% or at least one plane of inclusions able to trap the free carriers, wherein the inclusions are made of semi-conductor material whose band gap has a width smaller than that of the band gap of the material of the quantum wells.

2. Device according to claim 1, wherein the quantum wells are made of GaAs, barriers separating these wells are made of AlGaAs and the inclusions are made of InAs.

3. A photorefractive device intended to be exposed to a marking radiation which is provided to create a grating of interference fringes in the device, and to a reading radiation diffracted by the created grating, said device comprising:

an electro-optical material having a structure of layered quantum wells and being formed in an intrinsic semi-conductor matrix, said structure having an axis perpendicular to the layers of said quantum wells; and means for modifying an electric field in said material during an illumination by the marking radiation, said device being characterized in that said modifying means are placed on both sides of said material in said semi-conductor matrix and are able to trap, both parallel to the axis of the structure and perpendicular to this axis, free carriers generated by the marking radiation, said modifying means including on both sides of said material in said semi-conductor matrix at least one rough quantum well having a local width variation of more than 10% or at least one plane of inclusions able to trap the free carriers, wherein the material constituting the inclusions differs on both sides of the electro-optical material.

4. A photorefractive device intended to be exposed to a marking radiation which is provided to create a grating of interference fringes in the device, and to a reading radiation diffracted by the created grating, said device comprising:

an electro-optical material having a structure of layered quantum wells and being formed in an intrinsic semi-conductor matrix, said structure having an axis perpendicular to the layers of said quantum wells; and means for modifying an electric field in said material during an illumination by the marking radiation, said device being characterized in that said modifying means are placed on both sides of said material in said semi-conductor matrix and are able to trap, both parallel to the axis of the structure and perpendicular to this axis, free carriers generated by the marking radiation, said modifying means including on both sides of said material in said semi-conductor matrix at least one rough quantum well having a local width variation of more than 10% or at least one plane of inclusions able to trap the free carriers, wherein the inclusions have sizes of about 5 nm.

5. A photorefractive device intended to be exposed to a marking radiation which is provided to create a grating of interference fringes in the device, and to a reading radiation diffracted by the created grating, said device comprising:

an electro-optical material having a structure of layered quantum wells and being formed in an intrinsic semi-conductor matrix, said structure having an axis perpendicular to the layers of said quantum wells; and means for modifying an electric field in said material during an illumination by the marking radiation, said device being characterized in that said modifying means are placed on both sides of said material in said semi-conductor matrix and are able to trap, both parallel to the axis of the structure and perpendicular to this axis, free carriers generated by the marking radiation, said modifying means including on both sides of said material in said semi-conductor matrix at least one rough quantum well having a local width variation of more than 10% or at least one plane of inclusions able to trap the free carriers, wherein the density of the inclusions in each plane of inclusions is about $10^{11}$ $cm^{-2}$.

6. A photorefractive device intended to be exposed to a marking radiation which is provided to create a grating of interference fringes in the device, and to a reading radiation diffracted by the created grating, said device comprising:

an electro-optical material having a structure of layered quantum wells and being formed in an intrinsic semi-conductor matrix, said structure having an axis perpendicular to the layers of said quantum wells; and means for modifying an electric field in said material during an illumination by the marking radiation, said device being characterized in that said modifying means are placed on both sides of said material in said semi-conductor matrix and are able to trap, both parallel to the axis of the structure and perpendicular to this axis, free carriers generated by the marking radiation, said modifying means including on both sides of said material in said semi-conductor matrix at least one rough quantum well having a local width variation of more than 10% or at least one plane of inclusions able to trap the free carriers, wherein the thickness of the intrinsic semi-conductor matrix situated on both sides of a zone containing the electro-optical material and delimited by the inclusion planes is sufficiently small so as to enable the carriers trapped by the inclusion to leave the latter via a tunnel effect through this intrinsic semi-conductor matrix thickness.

7. Device according to claim 6, wherein on both sides of a zone containing the electro-optical material and delimited by the inclusion planes, the intrinsic semi-conductor matrix forms a potential barrier with a height smaller than the one formed by this matrix inside this unit.

\* \* \* \* \*